US011853305B2

United States Patent
Gong et al.

(10) Patent No.: US 11,853,305 B2
(45) Date of Patent: Dec. 26, 2023

(54) METHOD, DEVICE, AND COMPUTER PROGRAM PRODUCT FOR FILE ANNOTATION

(71) Applicant: EMC IP Holding Company LLC, Hopkinton, MA (US)

(72) Inventors: Min Gong, Shanghai (CN); Qicheng Qiu, Shanghai (CN); Jiacheng Ni, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/364,814

(22) Filed: Jun. 30, 2021

(65) Prior Publication Data

US 2022/0342890 A1    Oct. 27, 2022

(30) Foreign Application Priority Data

Apr. 23, 2021   (CN) .......................... 202110440639.1

(51) Int. Cl.
*G06F 16/2457* (2019.01)
*G06N 20/00* (2019.01)
*G06F 16/35* (2019.01)

(52) U.S. Cl.
CPC ........ *G06F 16/24573* (2019.01); *G06F 16/35* (2019.01); *G06N 20/00* (2019.01)

(58) Field of Classification Search
CPC .... G06F 16/24573; G06F 16/35; G06N 20/00
See application file for complete search history.

(56) References Cited

U.S. PATENT DOCUMENTS

| 10,262,240 | B2 | 4/2019 | Guo et al. |
| 10,742,399 | B2 | 8/2020 | Chen et al. |
| 11,429,813 | B1 | 8/2022 | Aghoram Ravichandran et al. |

(Continued)

OTHER PUBLICATIONS

Settles, Burr, Mark Craven, and Lewis Friedland. "Active learning with real annotation costs." Proceedings of the NIPS workshop on cost-sensitive learning. vol. 1. 2008. (Year: 2008).*

(Continued)

*Primary Examiner* — Mohamed Abou El Seoud
*Assistant Examiner* — William P Bartlett
(74) *Attorney, Agent, or Firm* — Amin, Turocy & Watson, LLP (57) ABSTRACT

File annotation is described. An example method includes: processing files to be annotated by using an annotation model to determine a first performance of the annotation model, the first performance being associated with the confidence of a model annotation result generated by the annotation model; if the first performance is lower than a predetermined threshold, determining a group of target files from the files based at least on the confidence of the model annotation result; acquiring truth-value annotation information of the group of target files for retraining the annotation model; and if a second performance of the retrained annotation model is higher than or equal to the predetermined threshold, determining annotation information for at least some of the files by using the retrained annotation model. Based on this approach, automatic annotation of files can be realized with less truth-value annotation information, thereby reducing annotation costs.

20 Claims, 3 Drawing Sheets

(56) References Cited

U.S. PATENT DOCUMENTS

| | | | | |
|---|---|---|---|---|
| 2007/0150801 | A1* | 6/2007 | Chidlovskii | G06F 40/169 |
| | | | | 715/210 |
| 2016/0162464 | A1* | 6/2016 | Munro | G06F 16/93 |
| | | | | 704/9 |
| 2016/0196250 | A1* | 7/2016 | Allen | G06F 16/285 |
| | | | | 715/230 |
| 2019/0318405 | A1 | 10/2019 | Hu et al. | |
| 2020/0019617 | A1 | 1/2020 | Eswaran et al. | |
| 2020/0286002 | A1* | 9/2020 | Szanto | G06N 20/20 |
| 2021/0042291 | A1* | 2/2021 | Banipal | G06N 5/02 |
| 2022/0180252 | A1* | 6/2022 | Marvaniya | G06F 16/9024 |
| 2022/0343120 | A1 | 10/2022 | Ni et al. | |

OTHER PUBLICATIONS

Baldridge, Jason, and Miles Osborne. "Active learning and the total cost of annotation." Proceedings of the 2004 Conference on Empirical Methods in Natural Language Processing. 2004. (Year: 2004).*

"AI Platform Data Labeling Service" [https://cloud.google.com/ai-platform/data-labeling/pricing] Google Cloud, retreived Sep. 27, 2022, 4 pages.

B. Settles. "Active Learning Literature Survey". Computer Sciences Technical Report 1648, University of Wisconsin-Madison. 2009. 47 pages.

D. Lewis and W. Gale. "A sequential algorithm for training text classifiers". In Proceedings of the ACM SIGIR Conference on Research and Development in Information Retrieval, ACM/Springer, 1994. 10 pages.

"Bidirectional Encoder Representations from Transformers (BERT)". [https://tfhub.dev/google/bert_uncased_L-12_H-768_A-12/1], TensorFlow Hub, retreived Sep. 27, 2022, 1 page.

"Keras Applications". [https://keras.io/api/applications/] Keras, retreived Sep. 27, 2022, 4 pages.

Faiss—A library for efficient similarity search and clustering of dense vectors [https://github.com/facebookresearch/faiss] GitHub, retreived Sep. 27, 2022, 5 pages.

Al Aghbari, Z, et al. 2020. SparkNN: A Distributed In-Memory Data Partitioning for KNN Queries on Big Spatial Data. Data Science Journal, 19: 35, pp. 1-14. Aug. 2020. DOI: https://doi.org/10.5334/dsj-2020-035 [https://datascience.codata.org/articles/10.5334/dsj-2020-035/].

Saikia, J, et al. "K-Nearest Neighbor Hardware Accelerator Using In-Memory Computing SRAM" [https://ieeexplore.ieee.org/document/8824822], 2019 IEEE/ACM International Symposium on Low Power Electronics and Design (ISLPED), 6 pages.

Long abstracts of Wikipedia [https://databus.dbpedia.org/dbpedia/text/long-abstracts/2020.07.01] Databus, Jul. 1, 2020, retreived Sep. 27, 2022, 4 pages.

"Gong et al. ""A Method for Processing Data, an Electronic Device, and aComputer Program Product"", U.S. Appl. No. 17/364,803, filed Jun. 30, 2021, 28 pages."

Office Action dated Aug. 11, 2022 for U.S. Appl. No. 17/364,803, 17 pages.

Final Office Action received for U.S. Appl. No. 17/364,803 dated Mar. 7, 2023 , 56 pages.

Non Final Office Action received for U.S. Appl. No. 17/385,700 dated Aug. 9, 2023, 34 pages.

* cited by examiner

METHOD, DEVICE, AND COMPUTER PROGRAM PRODUCT FOR FILE ANNOTATION

RELATED APPLICATION

The present application claims the benefit of priority to Chinese Patent Application No. 2021104406391, filed on Apr. 23, 2021, which application is hereby incorporated into the present application by reference herein in its entirety.

TECHNICAL FIELD

Embodiments of the present disclosure relate to the field of computers, and more particularly, to a method, a device, and a computer program product for file annotation.

BACKGROUND

In the file management of a large file system, it is usually necessary to annotate files to improve management efficiency. Such annotation information can help to retrieve or classify files more quickly. For example, a text file may be annotated to indicate the subject of the text content of the file, for example, economy, education, entertainment, etc.

Currently, manual annotation of files corresponds to higher costs. Some solutions try to automatically annotate files by using an annotation model based on machine learning, but such an annotation model still relies on truth-value annotation information obtained by manual annotation. Therefore, the hope is to be able to acquire a sufficiently accurate annotation model by using less truth-value annotation information.

SUMMARY

The embodiments of the present disclosure provide a solution for file annotation.

According to a first aspect of the present disclosure, a method for file annotation is provided. The method includes: processing a plurality of files to be annotated by using an annotation model to determine a first performance of the annotation model, the first performance being associated with the confidence of a model annotation result generated by the annotation model; if the first performance is lower than a predetermined threshold, determining a group of target files from the plurality of files based at least on the confidence of the model annotation result; acquiring truth-value annotation information of the group of target files for retraining the annotation model; and if a second performance of the retrained annotation model is higher than or equal to the predetermined threshold, determining annotation information for at least some of the plurality of files by using the retrained annotation model.

According to a second aspect of the present disclosure, an electronic device is provided. The device includes: at least one processing unit; and at least one memory, coupled to the at least one processing unit and storing instructions for execution by the at least one processing unit. The instructions, when executed by the at least one processing unit, cause the device to perform actions including: processing a plurality of files to be annotated by using an annotation model to determine a first performance of the annotation model, the first performance being associated with the confidence of a model annotation result generated by the annotation model; if the first performance is lower than a predetermined threshold, determining a group of target files from the plurality of files based at least on the confidence of the model annotation result; acquiring truth-value annotation information of the group of target files for retraining the annotation model; and if a second performance of the retrained annotation model is higher than or equal to the predetermined threshold, determining annotation information for at least some of the plurality of files by using the retrained annotation model.

In a third aspect of the present disclosure, a computer program product is provided. The computer program product is stored in a non-transitory computer storage medium and includes machine-executable instructions, wherein the machine-executable instructions, when run in a device, cause the device to perform any step of the method described according to the first aspect of the present disclosure.

The Summary section is provided in order to introduce the selection of concepts in a simplified form, which will be further described in the Detailed Description below. The Summary section is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

DETAILED DESCRIPTION

Example embodiments of the present disclosure will be described in more detail below with reference to the accompanying drawings. While the example embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, when a large number of files are to be annotated, some solutions train a machine learning model by manually annotating some of the files, thereby reducing the overall cost of file annotation. Therefore, people are paying more and more attention to how to further reduce the cost of manual annotation while ensuring the annotation accuracy of the machine learning model.

According to the embodiments of the present disclosure, a solution for file annotation is provided. In this solution, a plurality of files to be annotated are processed by using an annotation model to determine a first performance of the annotation model, the first performance being associated with the confidence of a model annotation result generated by the annotation model. If the first performance is lower than a predetermined threshold, a group of target files are determined from the plurality of files based at least on the confidence of the model annotation result. Then, truth-value annotation information of the group of target files is acquired for retraining the annotation model. If a second performance of the retrained annotation model is higher than or equal to the predetermined threshold, annotation information for at least some of the plurality of files is determined by using the retrained annotation model. Based on this approach, the embodiments of the present disclosure can obtain an annotation model with an adequate performance with less truth-value annotation information, thereby further reducing the cost of file annotation.

The solution of the present disclosure will be described below with reference to the accompanying drawings.

Figure 1:
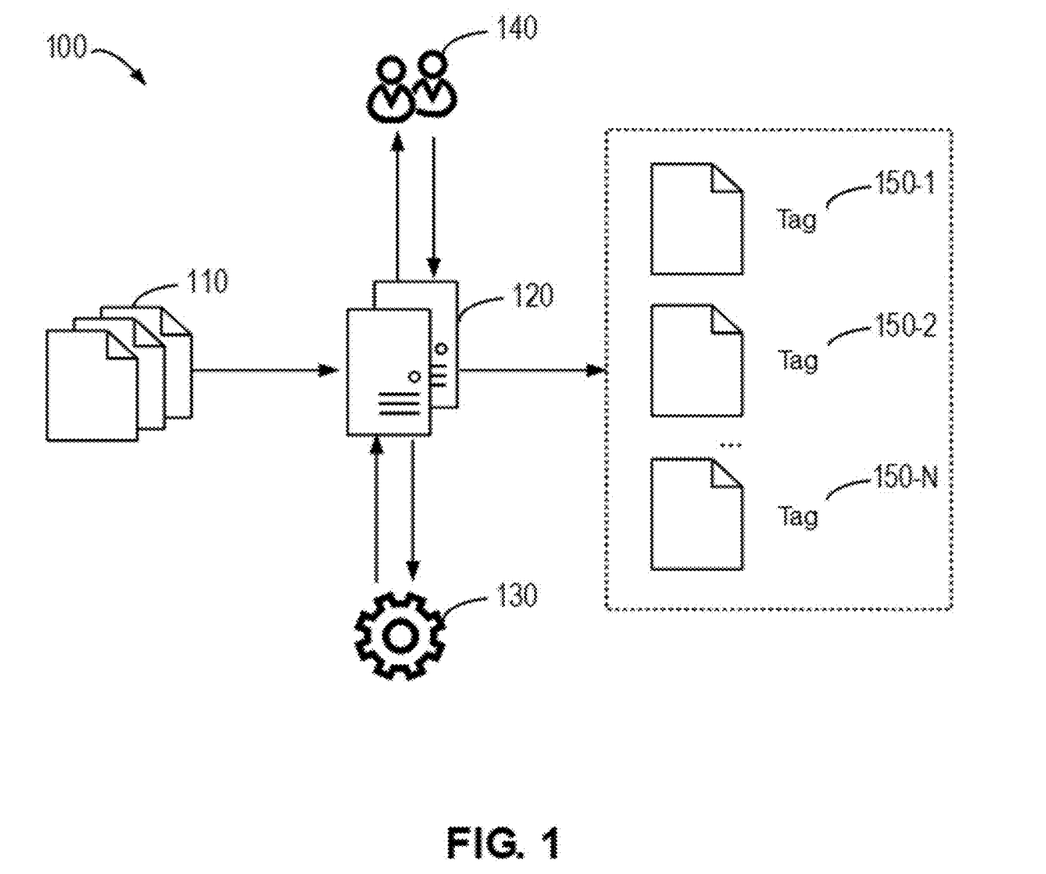
FIG. 1 shows a schematic diagram of an example environment in which embodiments of the present disclosure may be implemented.

FIG. 1 shows example environment 100 in which embodiments of the present disclosure may be implemented. As shown in FIG. 1, environment 100 includes annotation device 120, and annotation device 120 can receive a plurality of files 110 to be annotated.

As shown in FIG. 1, annotation device 120 can acquire annotation model 130 based on machine learning. Examples of such an annotation model 130 include, but are not limited to, various types of deep neural networks (DNN), convolutional neural networks (CNN), support vector machines (SVM), decision trees, random forest models, etc.

In some embodiments, annotation model 130 may be a model for a specific training data set. In some examples, the training data set may be a part of a set of files that a user expects to annotate. For example, users may expect to annotate one hundred thousand files, and annotation device 120 can select a certain number of files (for example, ten thousand files) from the one hundred thousand files, and send the files to annotation service provider 140 for obtaining truth-value annotation information of the ten thousand files.

Such truth-value annotation information can be used to initially train annotation model 130. Specifically, input for training annotation model 130 may include feature representations of these files, and a training objective of annotation model 130 may be to reduce the difference between the model annotation results determined by annotation model 130 and the corresponding truth-value annotation information.

The feature representations of the files can be determined in any suitable manner. For example, the feature representations of the files can be generated based on attribute information of the files by using a trained encoder. The present disclosure is not intended to limit the mode of generating the feature representations of the files.

Annotation device 120 may further process the plurality of files 110 by using annotation model 130, so as to determine the confidence of the model annotation result determined by annotation model 130. Further, annotation device 120 may determine the performance of annotation model 130 based on these confidences.

If the performance reaches a predetermined threshold, annotation device 120 may, for example, directly determine the model annotation result determined by annotation model 130 as annotation information of the plurality of files 110.

On the contrary, if the performance does not reach the threshold, annotation device 120 may further screen out a group of target files from the plurality of files 110, and acquire truth-value annotation information of the group of target files, so as to retrain annotation model 130. For example, annotation device 120 may send the group of target files to annotation service provider 140 to obtain the corresponding truth-value annotation information.

Annotation device 120 may further determine the performance of the retrained annotation model 130, and when the performance reaches the predetermined threshold, annotation information 150-1, 150-2, . . . , 150-N of at least some of the plurality of files 110 (individually or collectively referred to as annotation information 150) is determined by using the retrained annotation model 130. The detailed process of generating annotation information 150 will be described with reference to FIG. 2.

Figure 2:
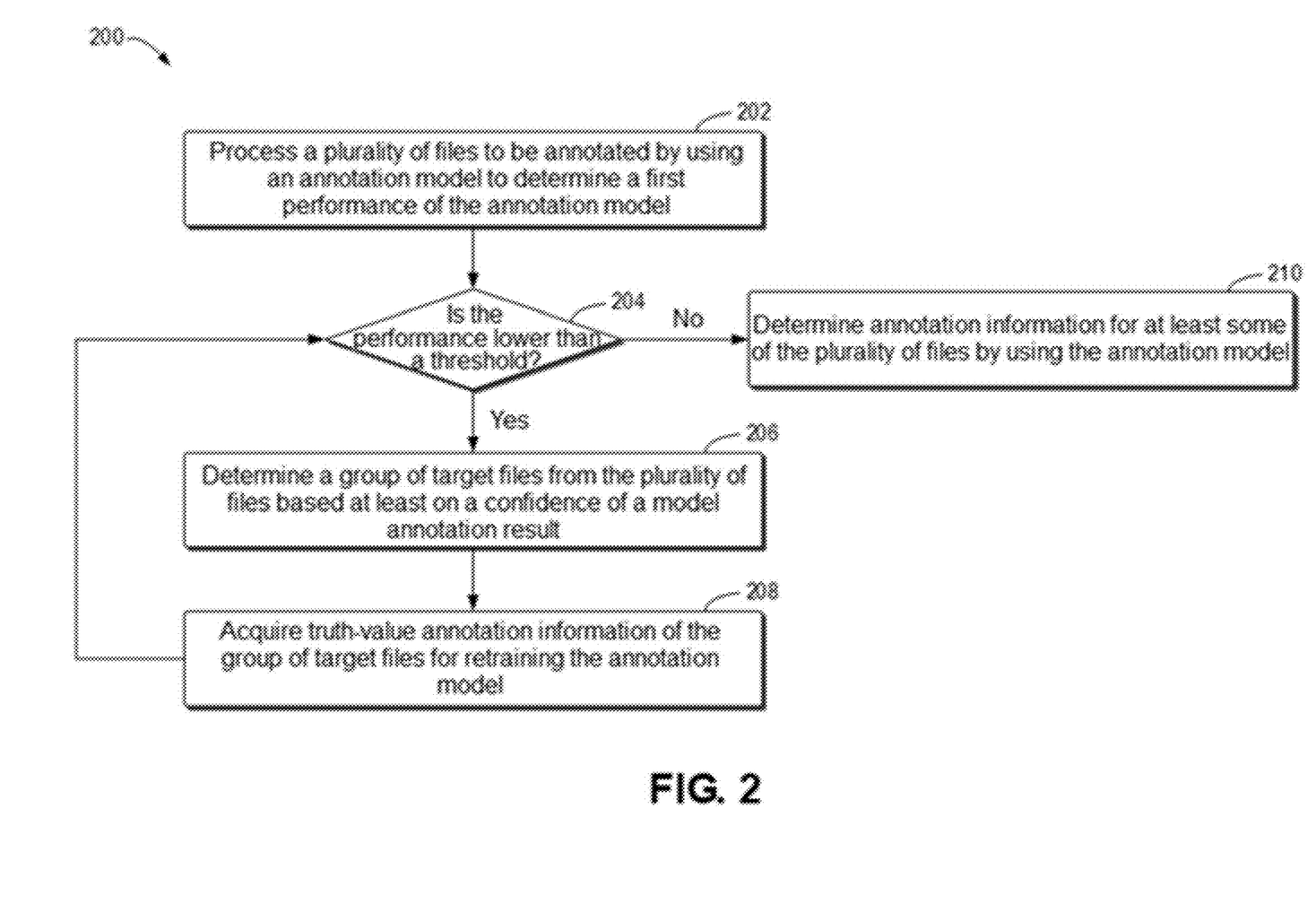
FIG. 2 shows a schematic diagram of a file annotation process according to some embodiments of the present disclosure.

FIG. 2 shows a flowchart of process 200 of file annotation according to some embodiments of the present disclosure. Process 200 may be implemented, for example, by annotation device 120 shown in FIG. 1.

As shown in FIG. 2, annotation device 120 processes the plurality of files 110 to be annotated by using annotation model 130 to determine a first performance of annotation model 130, the first performance being associated with the confidence of a model annotation result generated by annotation model 130.

In some embodiments, as discussed above, the plurality of files 110 may be a first subset of a set of files to be annotated by a user, and annotation model 130 is initially trained by using truth-value annotation information of a second subset in the set of files to be annotated.

For example, the set of files to be annotated by the user may include one hundred thousand files. For example, ten thousand files may be randomly selected therefrom as the second subset. In some embodiments, the truth-value annotation information of the second subset may be, for example, determined by annotation service provider 140. The annotation service provider 140 may, for example, include any suitable individual or organization.

In addition, it should be understood that "truth-value annotation information" herein means that such annotation information has a high confidence and is directly used for the training of annotation model 130, and "truth-value annotation information" is not necessarily required to be objectively accurate. For example, some experts may still make some wrong annotations when manually annotating files, but such annotation information is still regarded as "truth-value annotation information."

In some embodiments, the confidence of a model annotation result may be, for example, characterized by an uncertainty measure of the model annotation result. Such an uncertainty measure is, for example, a parameter that can be determined by the machine learning model and used to characterize the degree of certainty of the provided model annotation result. For example, Bayesian Active Learning by Disagreement (BALD) may be used as the uncertainty measure in the present disclosure. It should be understood that any other appropriate uncertainty measures may also be used. It should be understood that as the value of the uncertainty measure is larger, the degree of uncertainty of the annotation model for the model annotation result is higher.

In some embodiments, annotation device 120 may further determine the first performance based on uncertainty measures of model prediction results of the plurality of files 110. For example, annotation device 120 may determine the first performance based on the average value of uncertainty measures of the plurality of files 110. Alternatively, annotation device 120 may determine the first performance based on the maximum value of uncertainty measures of the plurality of files 110.

Alternatively, annotation device 120 may determine the number or proportion of files having uncertainty measures greater than a threshold in the plurality of files 110. For example, if the plurality of files 110 includes one hundred thousand files and the number of files having uncertainty measures greater than a predetermined threshold is fifty thousand, the first performance may be, for example, determined to be a proportion of 0.5.

In block 204, annotation device 120 determines whether the first performance of annotation model 130 is lower than a predetermined threshold. If yes, process 200 proceeds to block 206, and annotation device 120 determines a group of target files from the plurality of files 110 based at least on the confidence of a model annotation result.

In some embodiments, annotation device 120 may, for example, select files with a confidence lower than a predetermined level from the plurality of files 110 as the group of target files according to the magnitude of the confidence. Based on this approach, files that are currently difficult to be accurately annotated by annotation model 120 can be selected.

In some embodiments, annotation device 120 may, for example, also consider an expected annotation cost to acquire truth-value annotation information of the files, so as to achieve a balance between the increase in accuracy of the annotation model and the cost reduction. The process of screening target files will be described below with reference to FIG. 3. Specifically, FIG. 3 shows a flowchart of process 300 of screening target files according to some embodiments of the present disclosure.

Figure 3:
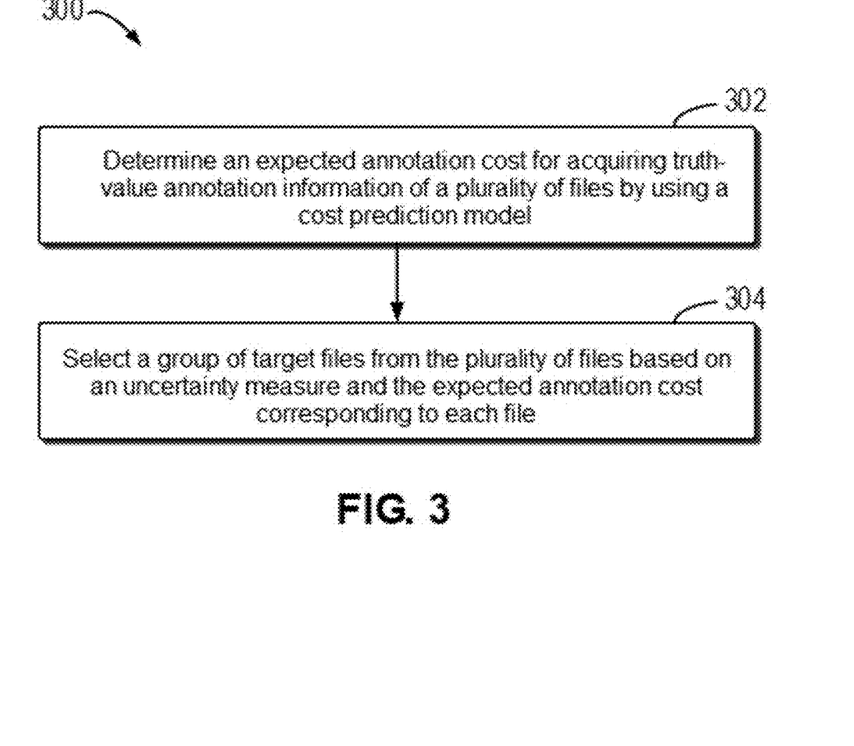
FIG. 3 shows a schematic diagram of a process of screening target files according to some embodiments of the present disclosure.

As shown in FIG. 3, in block 302, annotation device 120 may determine an expected annotation cost for acquiring truth-value annotation information of the plurality of files by using a cost prediction model, the cost prediction model being trained based on the historical annotation cost of a group of training files. In some embodiments, the expected annotation cost is determined by indicating at least one of an expected time for file annotation and an expected expense for file annotation.

In some embodiments, historical annotations of historical files by annotation service provider 140 may be used to construct the cost prediction model. Examples of such a cost prediction model may include, but are not limited to, various types of DNNs, CNNs, SVMs, decision trees, random forest models, etc.

In the training process, feature representations of the files may be input to the cost prediction model, and an objective function may be constructed based on an actual annotation cost of annotation service provider 140, so that the trained cost prediction model can determine the expected annotation cost based on the feature representations of the files.

It should be understood that the training of the cost prediction model may be performed by a device identical to or different from annotation device 120. Annotation device 120 may, for example, send the feature representations of files 120 to another device to obtain the expected annotation cost. Or, the cost prediction model may also be deployed on annotation device 120 to determine the expected annotation cost.

In block 304, annotation device 120 may select the group of target files from the plurality of files based on the uncertainty measure and the expected annotation cost corresponding to each file.

In some embodiments, annotation device 120 may determine the annotation score of each file based on the uncertainty measure and the expected annotation cost, the annotation score increasing as the uncertainty measure increases and decreasing as the expected annotation cost increases.

Illustratively, the annotation score may be, for example, expressed as the following function of the uncertainty measure and the expected annotation cost:

$$\text{Score}(x) = \alpha * \text{Uncertainty}(x) + \beta * 1/\text{Effort}(x) \tag{1}$$

where Score(x) represents the annotation score of file x, Uncertainty(x) represents the uncertainty measurement of file x, Effort(x) represents the expected annotation cost of file x, and $\alpha$ and $\beta$ are weight coefficients. It should be understood that $\alpha$ and $\beta$ may be predetermined constants, or specified by a user according to an actual scenario.

It should be understood that other appropriate formulas may also be used to determine the annotation score.

Further, annotation device 120 may select the group of target files from the plurality of files based on the annotation score.

In some embodiments, annotation device 120 may, for example, select a predetermined number of files with the largest annotation score as the group of target files. Alternatively, annotation device 120 may also determine files with an annotation score greater than a predetermined threshold as target files, regardless of the total number of target files in the group.

With continued reference to FIG. 2, in block 208, annotation device 120 acquires truth-value annotation information of the group of target files for retraining the annotation model.

In some embodiments, annotation device 120 may, for example, send the group of target files to annotation service provider 140 to acquire the truth-value annotation information of the group of target files. Further, annotation device 120 may retrain annotation model 130 by using the truth-value annotation information.

In some embodiments, annotation device 120 may, for example, perform additional training by using the feature representations of the group of target files and the corresponding truth-value annotation information based on an existing model, so as to obtain the retrained annotation device.

In still other embodiments, annotation device 120 may, for example, also add the group of target files to a previous training data set to construct a new training data set. Annotation device 120 may, for example, perform retraining of annotation model 130 by using the new training data set.

Then, process 200 further returns to block 204, and annotation device 120 further determines whether the second performance of the retrained annotation model is lower than a predetermined threshold.

In some embodiments, annotation device 120 may determine the second performance of the retrained annotation model according to the manner of determining the first performance above. Specifically, annotation device 120 may process the remaining files of the plurality of files 110, for obtaining truth-value annotation information, by using the retrained annotation model, and determine the second performance based on the confidence of the model annotation result.

If it is determined in block 204 that the second performance is higher than or equal to the predetermined threshold, process 200 may proceed to block 210. That is, annotation device 120 may determine annotation information for at least some of the plurality of files by using the retrained annotation model.

Specifically, annotation device 120 may directly use the model annotation result of the files determined by the annotation model for acquiring truth-value annotation information as annotation information 150 of these files.

Based on this approach, the embodiments of the present disclosure can always acquire the truth-value annotation information of files, which is more beneficial to improving the accuracy of a model, so that the cost of file annotation can be reduced while ensuring the accuracy of an annotation model.

With continued reference to FIG. 2, if it is determined in block 204 that the second performance of the retrained annotation model is still lower than the threshold, steps 206 and 206 may be performed iteratively until the performance of the retrained annotation model is higher than the predetermined threshold.

Specifically, annotation device 120 may further determine a group of new target files from files for which truth-value annotation information has not been acquired, and acquire truth-value annotation information of the group of new target files to retrain the annotation model.

Based on this approach, the embodiments of the present disclosure can iteratively optimize the performance of an annotation model, which can further reduce, for example, the number of files that are to be manually annotated, thereby further reducing the cost of file annotation on the premise that the accuracy of the model is ensured.

Figure 4:
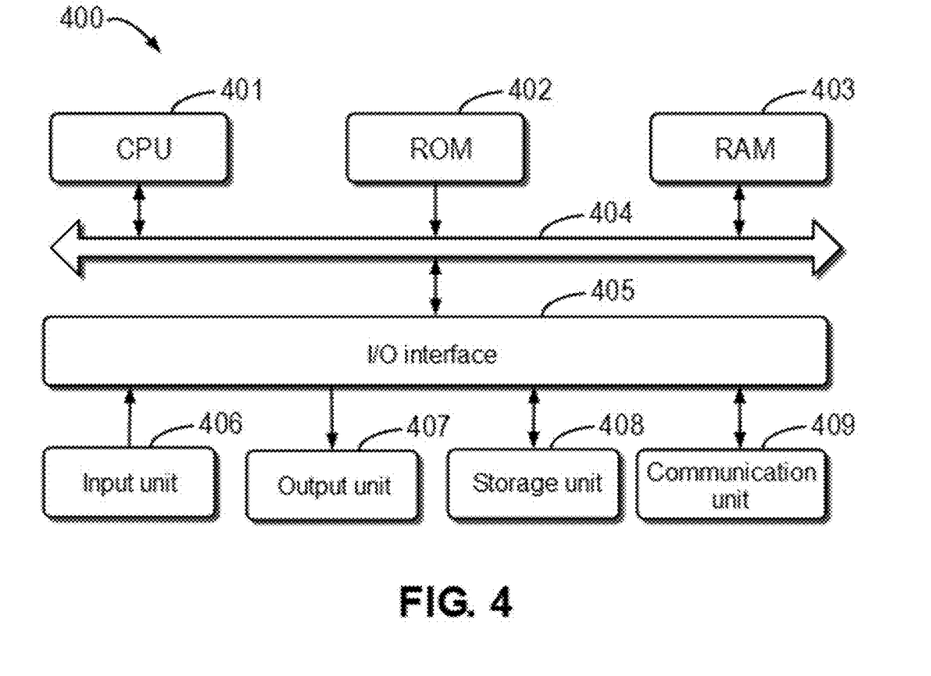
FIG. 4 shows a schematic block diagram of an example device that may be used to implement embodiments of the present disclosure.

FIG. 4 shows a schematic block diagram of example device 400 that may be used to implement embodiments of the present disclosure. For example, annotation device 120 according to the embodiments of the present disclosure may be implemented by device 400. As shown in the figure, device 400 includes central processing unit (CPU) 401 that may perform various appropriate actions and processing according to computer program instructions stored in read-only memory (ROM) 402 or computer program instructions loaded from storage unit 408 to random access memory (RAM) 403. In RAM 403, various programs and data required for the operation of device 400 may further be stored. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disk; and communication unit 409, such as a network card, a modem, and a wireless communication transceiver. Communication unit 409 allows device 400 to exchange information/data with other devices over a computer network such as the Internet and/or various telecommunication networks.

The various processes and processing described above, such as process 200, may be performed by processing unit 401. For example, in some embodiments, process 200 may be implemented as a computer software program that is tangibly included in a machine-readable medium, for example, storage unit 408. In some embodiments, part or all of the computer program may be loaded and/or mounted to device 400 via ROM 402 and/or communication unit 409. When the computer program is loaded into RAM 403 and executed by CPU 401, one or more actions of process 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, an instruction set architecture (ISA) instructions, machine instructions, machine-dependent instructions, microcode, firmware instructions, state setting data, or in one or more programming languages source code or object code written in any combination of the programming languages, including an object oriented programming language—such as Smalltalk, C++ like and conventional procedural programming languages—such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. When a remote computer is involved, the remote computer may be connected to a user computer through any kind of network, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flowcharts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed basically in parallel, and sometimes they may also be executed in an inverse order, which depends on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

What is claimed is:

1. A method, comprising:
   annotating, by a system comprising a processor, a plurality of files by using an annotation model to determine a first performance of the annotation model, the first performance being associated with a confidence that is a function of an aggregate uncertainty measure of a model annotation result generated by the annotation model;
   in response to the first performance being determined to be lower than a defined threshold, determining a group of target files from the plurality of files based at least on the confidence of the model annotation result, wherein determining the group of target files from the plurality of files comprises:
      determining a respective expected annotation cost, corresponding to each file of the plurality of files, for acquisition of truth-value annotation information comprising using a cost prediction model, the cost prediction model being trained based on historical annotation costs of a group of training files, and
      selecting the group of target files from the plurality of files based on a respective uncertainty measure corresponding to each file and the respective expected annotation cost corresponding to each file;
   acquiring truth-value annotation information of the group of target files;
   retraining the annotation model based on the truth-value annotation information of the group of target files, resulting in a retrained annotation model; and
   in response to a second performance of the retrained annotation model being determined to be higher than or equal to the defined threshold, determining annotation information for at least some of the plurality of files by using the retrained annotation model.

2. The method according to claim 1, wherein the confidence is a first confidence, and wherein
   a second confidence of an annotation prediction result of the group of target files is selected to be lower than a defined level.

3. The method according to claim 1, wherein selecting the group of target files from the plurality of files comprises:
   determining a respective annotation score of each file based on the respective uncertainty measure and the respective expected annotation cost, the respective annotation score increasing as the respective uncertainty measure increases and decreasing as the respective expected annotation cost increases, the determining of the respective annotation score of each file resulting in respective annotation scores of the files of the plurality of files; and selecting the group of target files from the plurality of files based on the respective annotation scores.

4. The method according to claim 1, wherein the respective expected annotation cost corresponding to each file is determined based on at least one of an expected time for file annotation or an expected expense for file annotation.

5. The method according to claim 1, further comprising:
in response to the second performance being determined to be lower than the defined threshold, iteratively retraining the retrained annotation model, to result in a further retrained annotation model, the iteratively retraining comprising:
determining a group of new target files from files for which associated truth-value annotation information has not been acquired; and
acquiring the associated truth-value annotation information of the group of new target files for the iteratively retraining of the retrained annotation model to result in the further retrained annotation model.

6. The method according to claim 1, wherein acquiring the truth-value annotation information of the group of target files comprises:
sending the group of target files to an annotation service provider device; and
receiving the truth-value annotation information of the group of target files from the annotation service provider device.

7. The method according to claim 1, wherein the first performance is determined based on at least one of:
an average value of the respective uncertainty measure of each of the plurality of files,
a maximum value of the respective uncertainty measure of each of the plurality of files, or
a number or proportion of files having respective uncertainty measures greater than a threshold in the plurality of files.

8. The method according to claim 1, wherein the truth-value annotation information is first truth-value annotation information, wherein the plurality of files is a first subset of a set of files to be annotated, and wherein the annotation model is initially trained by using second truth-value annotation information of a second subset in the set of files to be annotated.

9. A device, comprising:
at least one processing unit; and
at least one memory, coupled to the at least one processing unit and storing instructions for execution by the at least one processing unit, wherein the instructions, when executed by the at least one processing unit, cause the device to perform operations comprising:
annotating a group of files by using an annotation model to determine a first performance of the annotation model, the first performance being associated with a confidence that is a function of an aggregate uncertainty measure of a model annotation result generated by the annotation model;
based on the first performance being lower than a predetermined threshold, determining a group of target files from the group of files based at least on the confidence of the model annotation result, wherein determining the group of target files from the group of files comprises:
determining a respective expected annotation cost, corresponding to each file of the group of files, for acquisition of truth-value annotation information comprising using a cost prediction model, the cost prediction model being trained based on historical annotation costs of a group of training files, and
selecting the group of target files from the group of files based on a respective uncertainty measure corresponding to each file and the respective expected annotation cost corresponding to each file;
acquiring truth-value annotation information of the group of target files;
retraining the annotation model based on the truth-value annotation information of the group of target files resulting in a retrained annotation model; and
based on a second performance of the retrained annotation model being higher than or equal to the predetermined threshold, determining annotation information for at least some of the group of files by using the retrained annotation model.

10. The device according to claim 9, wherein the confidence is a first confidence, and wherein
a second confidence of an annotation prediction result of the group of target files is selected to be lower than a predetermined level.

11. The device according to claim 9, wherein selecting the group of target files from the group of files comprises:
determining a respective annotation score of each file based on the respective uncertainty measure and the respective expected annotation cost, the respective annotation score increasing as the respective uncertainty measure increases and decreasing as the respective expected annotation cost increases, the determining of the respective annotation score of each file resulting in respective annotation scores of the files of the group of files; and
selecting the group of target files from the group of files based on the respective annotation scores.

12. The device according to claim 9, wherein the expected annotation cost corresponding to each file is determined based on at least one of an expected time for file annotation or an expected expense for file annotation.

13. The device according to claim 9, wherein the operations further comprise:
based on the second performance being lower than the predetermined threshold, iteratively retraining the retrained annotation model, the iteratively retraining comprising:
determining a group of new target files from files for which corresponding truth-value annotation information has not been acquired; and
acquiring the corresponding truth-value annotation information of the group of new target files for the iteratively retraining of the retrained annotation model, resulting in the further retrained annotation model.

14. The device according to claim 9, wherein acquiring the truth-value annotation information of the group of target files comprises:
sending the group of target files to a provider device associated with an annotation service provider; and
receiving the truth-value annotation information of the group of target files from the provider device associated with the annotation service provider.

15. The device according to claim 9, wherein the first performance is determined based on at least one of:
an average value of the respective uncertainty measure of each file of the group of files,
a maximum value of the respective uncertainty measure of each file of the group of files, or
a number or proportion of files having respective uncertainty measures greater than a threshold in the group of files.

16. The device according to claim 9, wherein the truth-value annotation information is first truth-value annotation information, wherein the group of files is a first subset of a set of files to be annotated, and wherein the annotation model is initially trained by using second truth-value annotation information of a second subset in the set of files to be annotated.

17. A computer program product stored in a non-transitory computer storage medium and comprising machine-executable instructions, wherein the machine-executable instructions, when run in a device, cause the device to perform operations, comprising:
 annotating, by a system comprising a processor, files by using an annotation model to determine a first performance of the annotation model, the first performance being associated with a confidence that is a function of an aggregate uncertainty measure of a model annotation result generated by the annotation model;
 in response to the first performance being determined to be lower than a defined threshold, determining a group of target files from the files based at least on the confidence of the model annotation result, wherein determining the group of target files from the files comprises:
  determining a respective expected annotation cost, corresponding to each file of the files, for acquisition of truth-value annotation information comprising using a cost prediction model, the cost prediction model being trained based on historical annotation costs of a group of training files, and
  selecting the group of target files from the files based on a respective uncertainty measure corresponding to each file and the respective expected annotation cost corresponding to each file;
 acquiring truth-value annotation information of the group of target files;
 retraining the annotation model based on the truth-value annotation information of the group of target files resulting in a retrained annotation model; and
 in response to a second performance of the retrained annotation model being determined to be higher than or equal to the defined threshold, determining annotation information for at least some of the files by using the retrained annotation model.

18. The computer program product according to claim 17, wherein the confidence is a first confidence, and wherein:
 a second confidence of an annotation prediction result of the group of target files is selected to be lower than a defined level.

19. The computer program product according to claim 17, wherein selecting the group of target files from the files comprises:
 determining a respective annotation score of each file based on the respective uncertainty measure and the respective expected annotation cost, the respective annotation score increasing as the respective uncertainty measure increases and decreasing as the respective expected annotation cost increases, the determining of the respective annotation score of each file resulting in respective annotation scores of the files; and
 selecting the group of target files from the files based on the respective annotation scores.

20. The computer program product according to claim 17, wherein the expected annotation cost corresponding to each file is determined based on at least one of an expected time for file annotation or an expected expense for file annotation.

* * * * *